(12) United States Patent
Baeumler

(10) Patent No.: US 8,570,606 B2
(45) Date of Patent: Oct. 29, 2013

(54) METHOD, DEVICE AND COMPUTER PROGRAM TO CORRECT A REGISTRATION ERROR IN A PRINTING PROCESS THAT IS DUE TO DEFORMATION OF THE RECORDING MEDIUM

(75) Inventor: Ulrich Baeumler, Poing (DE)

(73) Assignee: Océ Printing Systems GmbH, Poing (DE)

( * ) Notice: Subject to any disclaimer, the term of this patent is extended or adjusted under 35 U.S.C. 154(b) by 611 days.

(21) Appl. No.: 12/914,250

(22) Filed: Oct. 28, 2010

(65) Prior Publication Data

US 2011/0102851 A1    May 5, 2011

(30) Foreign Application Priority Data

Oct. 29, 2009 (DE) .......................... 10 2009 051 197
Oct. 29, 2009 (DE) .......................... 10 2009 051 198

(51) Int. Cl.
*G06K 15/00* (2006.01)
*G06T 5/00* (2006.01)

(52) U.S. Cl.
USPC .......... 358/3.26; 358/451; 382/275; 382/298; 382/299; 382/294

(58) Field of Classification Search
None
See application file for complete search history.

(56) References Cited

U.S. PATENT DOCUMENTS

| | | |
|---|---|---|
| 4,721,969 A | 1/1988 | Asano |
| 2001/0021027 A1 | 9/2001 | Ueno et al. |
| 2007/0172270 A1 | 7/2007 | Jorgens et al. |

FOREIGN PATENT DOCUMENTS

| | | |
|---|---|---|
| DE | 102007040402 A1 | 3/2009 |
| WO | 2005031470 A1 | 4/2005 |

OTHER PUBLICATIONS

Neil Dodgson, "Some notes on sampling theory for the Part II Information Theory & Coding course", Notes, Neil Dodgson, Feb. 18, 2003, pp. 1-16.

Angelos Amanatiadis et al., "A survey on evaluation methods for image interpolation", Measurement Science and Technology, Meas. Sci. Technol. 20 (2009) 104015, 9 pp., Sep. 4, 2009.

*Primary Examiner* — Twyler Haskins
*Assistant Examiner* — Christopher D Wait
(74) *Attorney, Agent, or Firm* — Schiff Hardin LLP

(57) ABSTRACT

In a method to correct a registration error in a printing process, data of first and second images to be printed are subjected to a raster image process via which at least first and second raster graphics are generated. Control data for a print member or two respective print members are formed from the first and the second raster graphics. A recording medium is printed in a first printing process with the control data of the first image. The recording medium is subjected to a treatment via which the recording medium and the first image deform along at least one deformation axis. The recording medium is printed by the print member with the control data of the second image in a second printing process. To avoid a registration error between the first and second printed images, the control data of the respective raster graphic of at least one of the first and the second print images as a source image are processed along an image processing axis of the respective raster graphic that corresponds to the deformation axis, and wherein respective source pixels to be used for the respective raster graphic are selected stochastically from the source image in a direction transverse to the image processing axis.

13 Claims, 6 Drawing Sheets

METHOD, DEVICE AND COMPUTER PROGRAM TO CORRECT A REGISTRATION ERROR IN A PRINTING PROCESS THAT IS DUE TO DEFORMATION OF THE RECORDING MEDIUM

BACKGROUND

The preferred embodiment concerns a method, a device and a computer program to correct a registration error in a printing process that is due to deformation of the recording medium.

In printing processes in which a recording medium is subjected to a temperature treatment, the recording medium normally deforms. For example, if the recording medium is printed repeatedly in the same print group or by different print groups in the course of the printing process and a heat treatment takes place between the printing processes, the problem frequently exists that—due to the shrunk recording medium—the image to be printed appears larger in the second printing process than the image printed in the first printing process. Registration errors hereby arise that, for example, are disruptive if the recording medium is printed on both sides and the back-side printing region appears larger (due to the shrinkage effect) than the front-side printing region. In particular in book production, such registration errors are disruptive and incompatible with a high demand for print quality. In color printing in which color separations are printed successively in different print groups and a corresponding shrinkage effect occurs between the print groups, the color quality can also suffer from the fact that the color separations are not printed in register.

In many printing processes paper is used as a recording medium. The effect that the moisture naturally contained in paper escapes from the paper due to a heat treatment and that a shrinking of the paper occurs both in the direction of the paper fibers and transverse to the paper fibers can be of greater or lesser severity. For example, the severity thereby depends on the fiber direction, on the fiber or paper type, the storage conditions of the paper and additional conditions in the printing process, for example the environment humidity, the temperature etc.

Such a shrinking effect can occur in any type of printing process, in particular in electrographic printing processes and inkjet printing processes. In printing processes that operate with water-based inks, the shrinking effect of the paper can be particularly strong due to the strong moisture absorption of paper in the course of printing with the ink and the subsequent drying process for the ink.

Paper is a hygroscopic material that emits water vapor upon heating and stores water again upon cooling. The heat-dependent shrinkage can typically amount to 1 to 2% in printing processes of the aforementioned type, but also more or less. Given a paper width of 20" and a shrinkage factor of 1%, the shrinkage in the direction of the paper width amounts to approximately 5 millimeters, for example. Paper can also expand in the course of the cooling and storage of water.

In inkjet printing systems in which a paper web is printed in two print groups and the paper or the ink is dried by means of heat in a drying process after the first printing process, the paper is significantly dehumidified, whereby it shrinks. As described above, this leads to register deviations between the information printed by the two print groups. In such printing apparatuses this additionally leads to problems when they are designed print the complete paper width, i.e. when what is known as an edge-to-edge printing takes place. The shrinking of the paper in the region of the second print head then leads to the situation that the information at the outermost image edge can no longer be printed on paper; rather, the ink provided for this is sprayed, unused, past the paper. Regions of the print group—for example bearing parts, contact pressure rollers etc.—can thereby additionally be soiled, whereby cleaning processes are necessary. Furthermore, a print product that is processed later and that runs through this print group can thereby be soiled so badly that it must be discarded as spoilage. A significant danger is also that important print data of the border region on the print product are not printed, and therefore the respective printed document is incomplete.

The aforementioned problems appear particularly disruptively if the printing process occurs by means of a print head in which a discrete number of write elements produce the printing process, for example light-emitting diodes arranged in a row or matrix to expose an electrophotographic element or inkjet nozzles arranged in rows and/or columns.

A method for registration correction with paper shrinkage is known from DE 10 2007 040 402 A1, in which a print element row in the second printing process is arranged rotated by an angle relative to a print element row of a first printing process with regard to a predetermined axis of the paper movement direction, such that the distance between the pixels (image elements) generated with the print element rows is reduced. In the second printing process an image that is shrunk corresponding to the paper shrinkage is thereby written to the paper web. What is disadvantageous in such a method is that, for example, mechanical adjustments to the print head that correspond to the degree of shrinkage are necessary, which adjustments are relatively complicated.

Furthermore, in DE 10 2007 040 402 A1 it is proposed for a duplex printing process to shift print frames of the print images of the front side and back side counter to one another so that their central axes coincide. It can thereby be produced that the front and back sides overlap centrally and the registration errors at the edges of the print images distribute symmetrically on both sides, i.e. are essentially centered. Given a printing process that starts per line at one lateral edge of the recording medium, this furthermore has the consequence that the registration errors at the row end are halved. However, a complete compensation of the registration error cannot be brought about by this. For large print widths (for example of 30") and a degree of shrinkage of 1%, this still leads to a double-sided registration error of approximately 4 millimeters, respectively at the edges along the axis of shrinkage, which is unacceptable in many printing applications.

A method to correct paper shrinkage that starts with the generation of a bitmap is known from WO 2005/031470 A1. To generate an image for the first printing process or for the second printing process, the number of pixels to be considered in the printing is modified corresponding to the shrinkage to be expected in the direction of one axis. For this it can be provided to enlarge the rastered and dithered image for the first printing process by inserting pixels corresponding to the degree of shrinkage, or to reduce the image for the second printing process by deleting pixels corresponding to the degree of shrinkage. What is disadvantageous in the method described there is that the insertion or omission of entire pixels in the bitmap can lead to image distortions or artifacts.

FIG. 2 schematically shows the method described in WO 2005/031470 A1. A bitmap 1 in which a binary image 2 is stored is subjected to a shrinkage compensation process 3. The process takes place along an image processing axis BA in which an image column 6 is deleted, whereby the image 2 is shrunk to an image 7. The shrinkage factor 4 that is thereby achieved or enters into the process corresponds to a shrinkage factor of the recording medium 11 in the printing process along its shrinkage axis SA. The adjacent column 6a still remains in the target image 7 due to the deletion. However, the remaining pixels in this region no longer form squares; rather, they are only rectangles, meaning that an artifact exists in the target image 7. The unwritten border region 9 to the right of target image 7 is, however, larger by one column than the unwritten border region 8 of the source image, whereupon the image shrinkage that is produced is apparent.

The print head 10 that prints the paper web 11 is then controlled with the data of the target image 7. The shrinkage axis SA corresponds to the paper web 11 of the image processing axis BA.

An electronically assisted method for the correction of registration errors in electrographic color printers is known from U.S. Pat. No. 4,721,969 A, in which registration errors of the color separations are determined using registration markings that are detected with CCD sensors.

The aforementioned publications are herewith incorporated by reference into the present Specification.

SUMMARY

It is an object to achieve a method, a device and a computer program to correct a registration error in a printing process that, on the one hand, operate on the basis of electronic image processing and, on the other hand, cause as few disruptive artifacts of the print images as possible.

In a method to correct a registration error in a printing process, data of first and second images to be printed are subjected to a raster image process via which at least first and second raster graphics are generated. Control data for a print member or two respective print members are formed from the first and second raster graphics. A recording medium is printed in a first printing process with the control data of the first image. The recording medium is subjected to a treatment via which the recording medium and the first image deform along at least one deformation axis. The recording medium is printed by the print member with the control data of the second image in a second printing process. To avoid a registration error between the first and second printed images, the control data of the respective raster graphic of at least one of the first and the second print images as a source image are processed along an image processing axis of the respective raster graphic that corresponds to the deformation axis, and wherein respective source pixels to be used for the respective raster graphic are selected stochastically from the source image in a direction transverse to the image processing axis.

DESCRIPTION OF THE PREFERRED EMBODIMENTS

Figure 1:
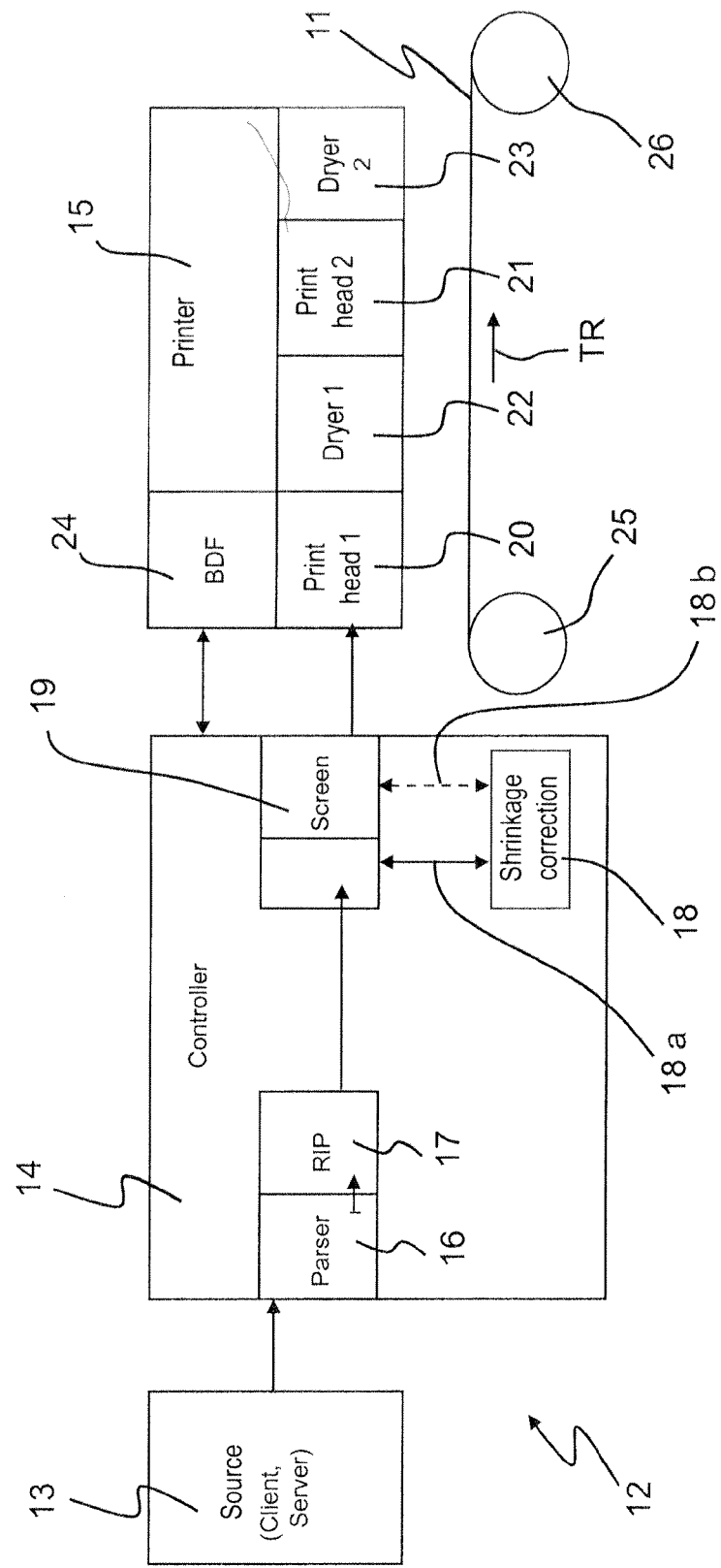
FIG. 1 illustrates a printing system.
Figure 2:
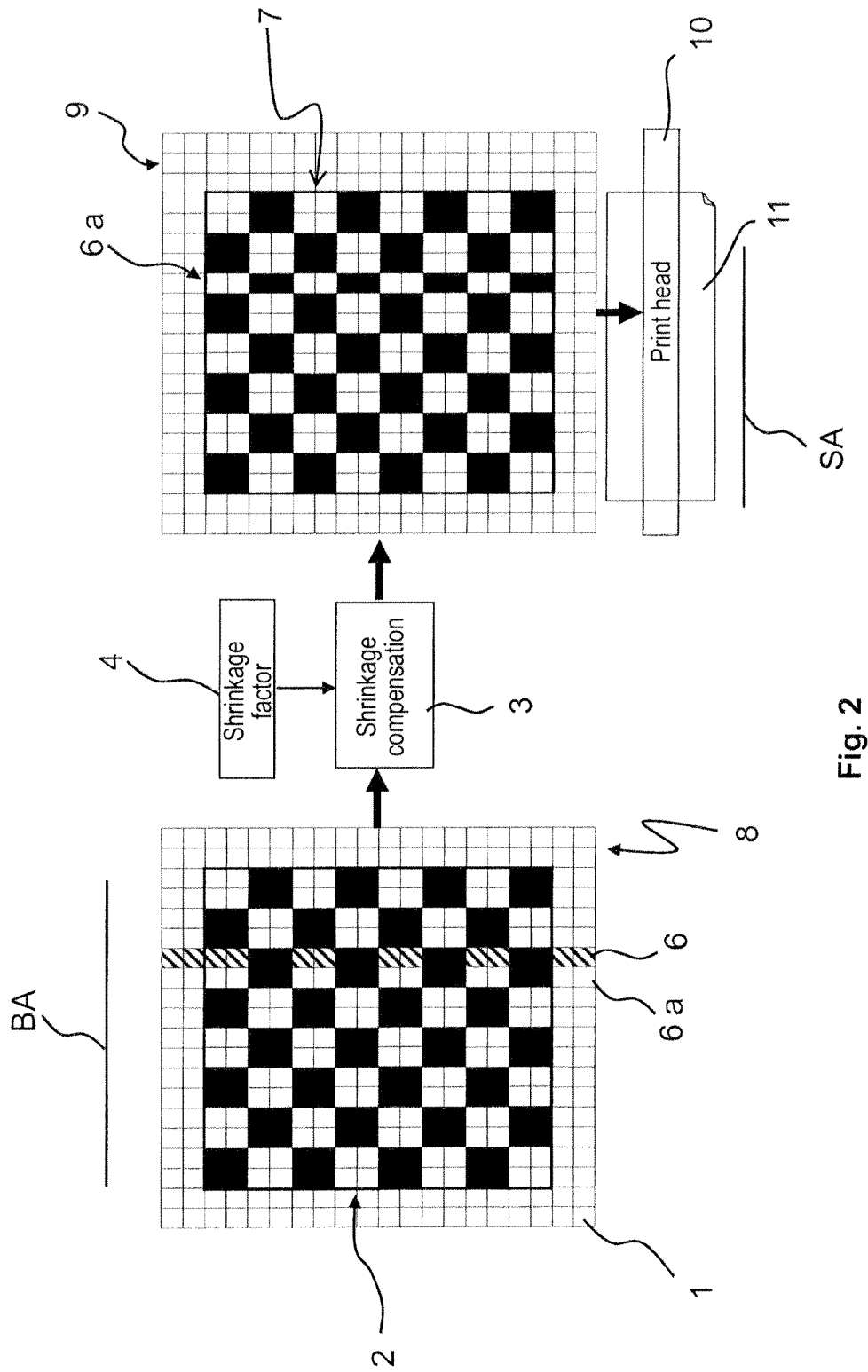
FIG. 2 illustrates a shrinkage compensation corresponding to the prior art.

For the purposes of promoting an understanding of the principles of the invention, reference will now be made to the preferred embodiments/best mode illustrated in the drawings and specific language will be used to describe the same. It will nevertheless be understood that no limitation of the scope of the invention is thereby intended, and such alterations and further modifications in the illustrated method and such further applications of the principles of the invention as illustrated as would normally occur to one skilled in the art to which the invention relates are included.

According to a first embodiment, a correction of a registration error occurs in a printing process in which data of images to be printed are subjected to a raster image process via which at least one raster graphic structured in rows and columns is respectively generated. Control data for at least one print group are respectively formed from the raster graphic. Furthermore, a recording medium is printed with a first print image in a first printing process with the control data from the first raster graphic and is subsequently a treatment via which it and the first print image deform at least along one deformation axis. The recording medium is then printed with a second print image with corresponding control data from a second raster graphic. To avoid a registration error between the two print images, the data of the raster graphics of at least one of the two print images are processed along an image processing axis of the raster graphic that corresponds to the deformation axis, wherein it applies that:

a target pixel is calculated according to a predetermined calculation rule from n respective, adjacent source pixels, wherein n is a whole number and greater than 1, the proportion of processed points along the image processing axis corresponds to the deformation factor.

According to this embodiment it has been realized that an improvement of a shrinkage correction can take place by means of calculation of a target pixel from multiple adjacent source pixels because the target pixel is created not only in that information from the source image was completely deleted but rather that the information of multiple adjacent source pixels are plugged into it. It can thereby be achieved that the information of each source pixel is retained at least in part or proportionally in the target pixel, and thus fewer artifacts arise. This type of shrinkage correction can on the one hand take place in software given the generation of a bitmap to control a print group. Two pixels or two columns of the source image are thereby respectively combined into one column of the target image. Artifacts—in particular low-frequency repetitions of identical structures that are visibly disruptive—can thereby be avoided.

The deformation of the recording medium can also be viewed as a length change along the deformation axis. The treatment of the recording medium can in particular be a heat treatment. The recording medium can thereby shrink in particular. The deformation axis can then also be designated as a shrinkage axis. However, depending on its material (for example metal) and the treatment type (for example a moistening of paper) the recording medium can also expand. Instead of a reduction of the images in the target bitmap relative to the source bitmap, a corresponding enlargement can also be provided.

The calculation of a target pixel from multiple source pixels of the raster graphic can then take place particularly effectively if the source pixels respectively comprise multiple data bits, for example 8 bits respectively. A new grey level for the target pixel can then be calculated from corresponding grey levels of the source pixels. A corresponding target bytemap can then be calculated from a corresponding source bytemap. This in particular applies for a printing process in which print data are initially subjected to a raster process (RIP process) in which rastered image data are generated from the source image data, wherein the rastered data respectively comprise multiple bits and are subsequently subjected to what is known as a screening, dithering or, halftoning process in which the rastered image data are converted into binary image data specific to the printing apparatus. The image processing process according to the first embodiment then acts particularly advantageously if it is implemented after the RIP process and before the screening, dithering or, halftoning process.

It is also advantageous that the deformation correction can occur after the RIP process and thus can be decoupled from this.

The calculation rule applied to the raster graphic can comprise an image processing window in which a predetermined weighting for n×p comprises pixels adjacent to the respective source pixel and possibly including this, wherein n and p are whole numbers greater than zero. The calculation rule can in particular provide an arithmetic mean of adjacent source pixels.

For example, with the preferred embodiment it can be provided that images of an original size are used in a first printing process and images compressed according to the shrinkage factor are used in the second printing process. However, it can also be provided to generate an image of an original size in the second printing process and an image enlarged corresponding to the shrinkage factor in the first printing process.

According to a second embodiment that can also be viewed as independent of the first embodiment, a correction of a registration error takes place in a printing process in which data of images to be printed are subjected to a raster image process via which a respective raster graphic structured in rows and columns is generated. Respective control data for at least one print group are formed from the raster graphic, whereupon a recording medium is printed with the control data of a first image in a first printing process and the recording medium is subjected to a treatment via which the recording medium and the printed first image deform by a deformation factor along at least one deformation axis. The recording medium is printed with the control data of a second image in a second printing process. To avoid a registration error between the two printed images, the data of the raster graphic of at least one of the two images are processed along an image processing axis of the raster graphic that corresponds to the deformation axis. The respective source pixels to be used are thereby stochastically selected from the source image, transverse to the image processing axis.

Via an image processing according to the second embodiment it can be achieved that pixels are not omitted at exactly equidistant intervals in the course of the deformation correction for an image reduction but rather are removed with a stochastic distribution. It can thereby be provided in particular that a column and/or line is removed within the matrix structure of the raster graphic and it is established that pixels stochastically distributed by a predetermined or calculated pixel distance around the respective row and/or column are omitted. A corresponding method with stochastic distribution can also be applied to enlarge the raster graphic.

According to a third embodiment that can also be viewed as independent of the first two embodiments cited above, a method to determine the deformation factor of a recording medium after a printing process (which method is simple to handle) is proposed in which the recording medium is first printed by a first printing process and is then subjected to a treatment via which the recording medium and the printed first image deform by the deformation factor at least along one deformation axis. It is thereby provided that a ruler is printed in the first printing process and the same ruler is also printed in the second printing process. In both the first printing process 1 and the second printing process 2 the recording medium is directed along a fixed reference edge at which a predetermined point of the ruler (advantageously the zero point) is printed. After traversing the entire printing process, the two markings of the ruler are then determined that were printed on the opposite side of the recording medium along the deformation direction to be determined (in particular transversal to the reference edge). Due to the deformation of the recording medium, the ruler printed in the second printing process will have ended at a smaller value of the scale than the ruler printed in the first printing process. In the case of a shrinkage, the second printed ruler will essentially "break away" at this lateral edge of the recording medium. The deformation factor can easily be derived from the comparison of the two scale values. This value can then be used for the above image processing process.

From the third embodiment, the determination of the degree of deformation or deformation factor can be even further simplified in that a calculation routine and a user interface are provided at the printing apparatus, in which the user must only read off the value of the first ruler and the value of the second ruler and input them into the user interface. The routine then calculates the necessary factor for the deformation compensation from both numbers and can communicate it directly to the routine that executes the compensation on the raster graphics. In an even further automated embodiment, the ruler values can be detected and read automatically by sensors (for example CCD cameras) and the subsequent calculation of the deformation factor can likewise be implemented automatically.

The statements that were made regarding the first embodiment in particular also apply to the second and third embodiments of the invention.

Exemplary embodiments of the invention are described in the following. Insofar as elements of different Figures are the same, the same reference characters are also used.

A printing system 12 is shown in FIG. 1 in which print data are transferred from a data source 13 (a client computer or print server, for example) to a controller 14 in which the print data are prepared for output to a printing apparatus 15, and which likewise is essentially a computer. In the controller 14 the incoming print data are interpreted by means of a parser 16. They can exist in an arbitrary print data language that the controller 14 supports. Examples of such printing languages are Advanced Function Presentation (AFP), Portable Document Format (PDF), Page Command Language (PCL) or Personalized Page Markup Language (PPML). The analyzed data are then supplied to a raster image processor (RIP) in which raster graphics (bitmaps) constructed pixel-by-pixel are generated. In order to be able to assign grayscale images and color images, multiple bits are associated with every pixel of the bitmap, for example 8 bits for 256 grey levels. For the color printing such a bitmap (plane) can be provided per color separation (C, M, Y, K). In the course of the parsing process and the raster process, it is established in the controller 14 which document page of the incoming developer station should be printed at the first print head 20 and which part should be printed by the second print head 21. Before the data are supplied to the screening module 19 (in which bitmaps with only one bit per pixel are generated from the raster graphics and color data are divided up as necessary into raster-specific angles), which raster graphics are reduced or enlarged is decided in a shrinkage correction module 18. The variation of the raster graphics can thereby take place (arrow 18a) in an intermediate step between the rastering and the screening (also called dithering or halftoning). The data that are prepared in this manner are then supplied to the printer 15 and there are divided up to the two print heads 20, 21. For printing the paper web 11 is unwound from an unspooling roller 25; printed with water-based ink (for example) with the first print head 20 by means of inkjet nozzles arranged per point; and then the paper web 11 together with ink is dried in a first dryer 22, turned and transported along transport direction TR to the second print head 21 with which the corresponding backside image is printed in register on the paper web 11 by means of ink. The backside image is also dried in the second dryer 32 and the paper web 11 is then wound on the takeup roller 26.

The two print heads 20, 21 can be essentially identical in design and can be housed in a common housing or a duplex printing apparatus or in different housings of two individually operable printing systems that are, however, coupled as what is known as a twin system. It is also possible that the first printing process and the second printing process are executed by the same print head on the front or backside of the recording medium and that the corresponding printing apparatus contains only one print head in total.

Figure 3:
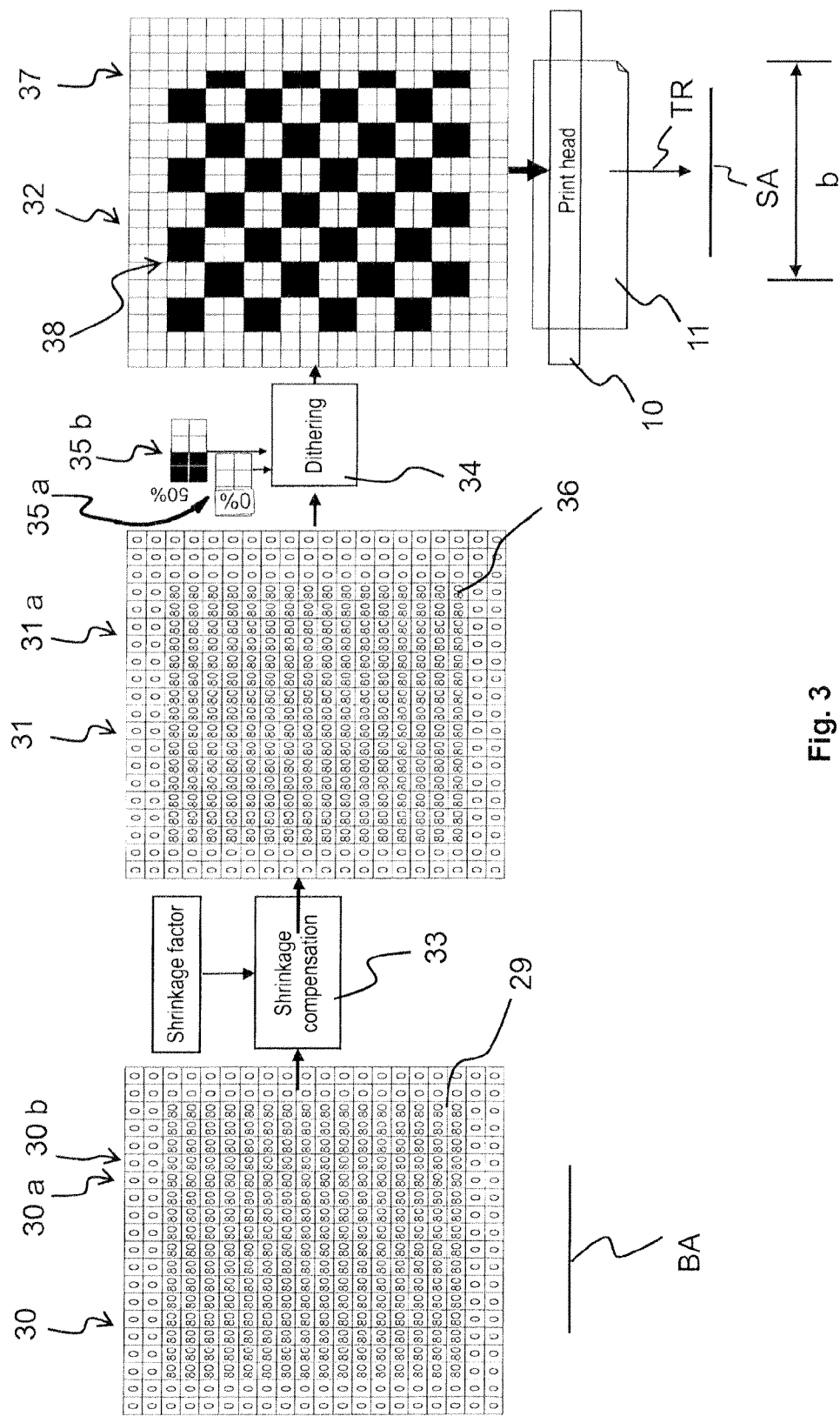
FIG. 3 illustrates a first example of a shrinkage compensation according to the preferred embodiment.

An example of a processing of a raster graphic according to the preferred embodiment for shrinkage compensation is shown in FIG. 3. A section of a source bitmap 30 that was generated in a raster process is shown to the left. Each of the small squares represents an image point (pixel) of a primary color of the printer. The numerical value indicated in the squares corresponds to the byte value and indicates the respective tone value of the pixel. The value range goes from 0 to 255 or 0×FF, corresponding to discrete tone values (grey levels) from 0 to 100%. For simplification only three different tone values are used, namely 0 (0%), 0×80 (50%) and 0×FF (100%). In the shown example the source image 29 is a homogeneous surface with a 50% halftone value corresponding to a grey tone or the value 0×80 of the corresponding source bitmap 30. For presentation reasons only the values "80" for 0×80 and "F" for 0×FF are respectively shown in the pixels in FIGS. 3 through 5.

The dithered matrix 32 that is generated from the source bitmap 30 of the raster graphic after implementing the shrinkage compensation 33 with the influence of a shrinkage factor and subsequent dithering with dither matrices 35a and 35b is shown on the right side. The dithered bitmap is adapted to the respective print head 10 that is used and can represent one bit of information (as shown) or can also have multiple bits per pixel if the print head is in the position to depict corresponding grey levels for its part.

In the shown example, the shrinkage correction occurs along the image processing axis BA that corresponds to the shrinkage axis SA of the paper 11 and, for its part, lie transverse to the transport direction TR of the paper web 11. However, in principle a shrinkage compensation can also take place corresponding to the paper transport direction TR, i.e. perpendicular to the directions SA, BA.

To compress the raster graphic or the source image 29 along the image processing axis BA, the columns 30a and 30b of the source bitmap 30 are combined with one another line by line such that the arithmetic mean is produced from the two respective pixel values. In the target bitmap 31 only one column 31a is thereby obtained from the two columns 30a, 30b. The quadratic source image 29 formed by the pixels with the values 80 is thus shrunk by precisely one column for the target image 36 of the target bitmap 31. However, the target column 31a calculated from columns 30a and 30b respectively has the same grey values 0×80 in the region of the target image 36 because the corresponding grey values of the source pixels of both columns 30a, 30b likewise have the values 0×80.

The data of the dithering bitmap 32 are formed from the target bitmap via the dithering process 34 (also called a screening or halftoning process) with the dithering matrices 35a, 35b (which here are shown only by way of representation as matrices with 8 pixels respectively but can actually be significantly larger). This dither bitmap 32 is thereby likewise accordingly compressed in the region of the outermost right border columns 37 so that the dithered image 38 is reduced to precisely the width b of the shrunk paper web 11 and can be used to control the second print head 21.

Figure 4:
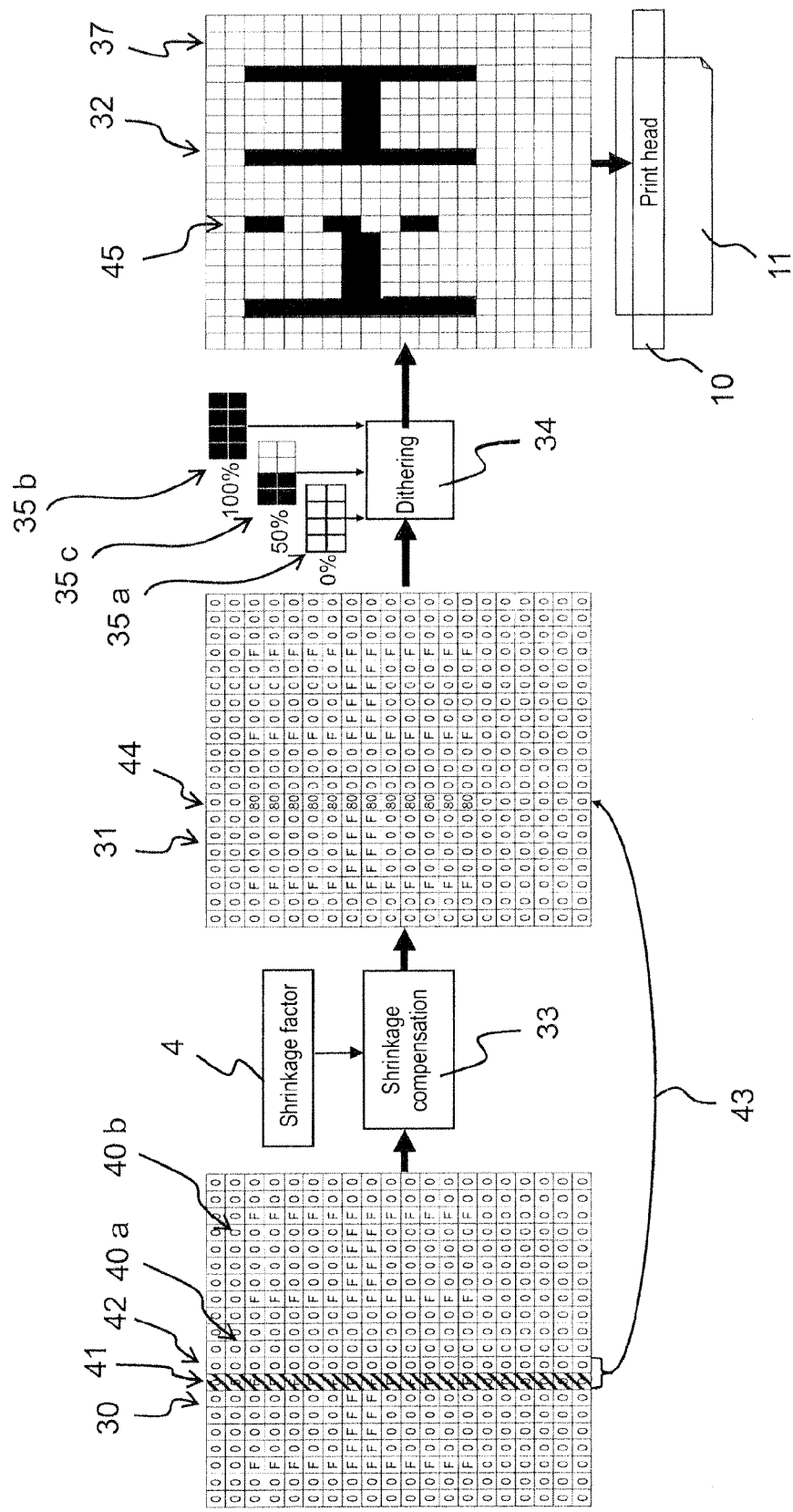
FIG. 4 illustrates a second example of a shrinkage compensation according to a second preferred embodiment.

In the workflow that is schematically shown in FIG. 4 for the compensation of the paper shrinkage, the source bitmap 30 contains pixels that correspond to a full tone (100% black, value 0×FF) and that contain capital letters "H" 40a, 40b situated next to one another as image information 2. From this it is additionally assumed that a very critical region is selected for calculation of the shrinkage, namely the column 41 that forms the right leg of the left H. Corresponding to the shrinkage factor 4, the arithmetic mean of respective adjacent pixels of the selected column 41 and its right neighboring column 42 of the source image are calculated line by line in the shrinkage compensation function 33 of this exemplary embodiment for a target point in column 44 and are mapped to the column 44 of the target bitmap according to the mapping function 43. The function for the arithmetic mean then reads:

$$ZP_{ij} = \frac{Q1_{ij} + Q2_{ij+1}}{2}$$

wherein $ZP_{ij}$ is the target value of the i-th row of the j-th column, $Q1_{ij}$ is the source value of the i-th row in the j-th column (column 41) and $Q2_{ij+1}$ is the source value of the i-th row of the j+1-th column (column 42).

Therefore the target pixels of the right leg of the left "H" have the value 0×80 in column 44. Via this type of mapping of two source image columns 41, 42 to a target image column 44 it is thus achieved that the edge of the left "H" does not disappear entirely but rather is shown only with a lower tone value. The image information is thereby essentially retained. If the target bitmap 31 is subjected to the dithering process 34 with the three schematically indicated dither matrices 35a (for 0% tone value), 35b (for 50% tone value) and 35c (for 100% tone value), the dithered bitmap 32 results. As can again be perceived in the border region 37, the image is shrunk by one column in the row direction. The separation of the two letters "H" from one another is less by one column than in the image of the source bitmap 30. The right leg of the left "H" is still largely visible even after the dithering process. The partially absent segments are merely to be ascribed to the dithering process. If such dithered letters are printed with high resolution, the human eye can barely perceive the missing portions or supplements them automatically so that the rendered print image appears complete.

Instead of the reduction of the target image as described in FIG. 4 to control the second print group, an enlargement of the target image can also be provided to control the first print group. For example, via a corresponding averaging of two columns of the source image a third column for the target image can be added.

Figure 5:
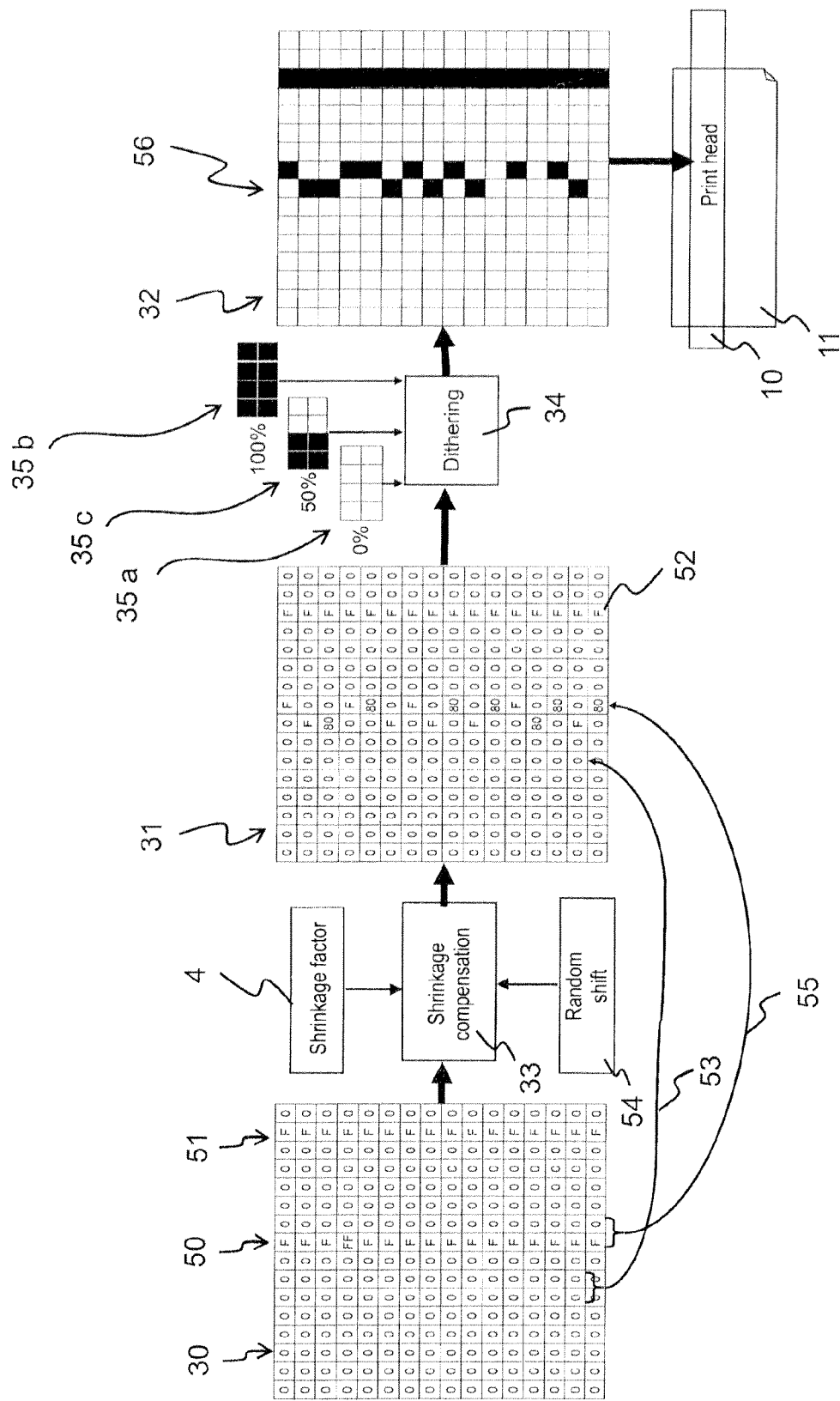
FIG. 5 illustrates a third example of a shrinkage compensation according to a third embodiment.

A further example of a shrinkage compensation is shown in FIG. 5, in which a source image comprises two respective hairlines 50, 51 that are one column wide. The compensation here likewise occurs via calculation of a new image column from the values of two adjacent columns of the source image. The situation corresponds approximately to the compensation shown in FIG. 5, in which the right leg of the left letter "H" amounts to exactly one image column, i.e. represents a hairline. Two corresponding hairlines are provided in the columns 50, 51 of the source bitmap 30 in FIG. 5. Corresponding to the compensation provided in FIG. 4, the pixel 52 in the target bitmap 31 is calculated in the last row in the hairline column 50, together with the adjacent point to the right, via a mapping 53. The value 0×80 for the target pixel 52 is thereby calculated in turn from the values 0×FF and 0 of the two source pixels. In the shrinkage compensation of this exemplary embodiment it is additionally provided that a random shift 54 is inserted using a random number generator, such that a corresponding target pixel in the target bitmap is respectively calculated line by line from two adjacent source pixels of a line to the left and to the right of the hairline column 50 acting as a basis. For example, in the penultimate image row of the source bitmap 30 a new target point in the target bitmap 31 that lies only two columns from the hairline pixel with the value 0×FF of the target bitmap 31 is calculated by means of mapping 55 from the two pixels that lie two or three columns to the left of the base column 50.

The following criteria and process steps are thus used to calculate a new target pixel:

1. A base column is selected in the source bitmap.
2. A limit value K is established that determines what pixel distance from the base column the shrinkage compensation can apply at a maximum.
3. A whole-number value that lies between −K and +K is determined line by line with a random number generator, and using the whole-number value it is determined with which column shift (relative to the base column) the two source image values are used to calculate the target image value.
4. The target image value is calculated from the two source image values according to a predetermined function.

The merging of source pixels does not always take place in the same column with the method; rather, it takes place line by line around the base column at stochastic intervals, but at most at a distance of K columns. It is thereby achieved that regular structures are no longer detectable in the printout. For example, hatched surfaces thereby produce a smoother effect.

The target image map that is calculated in such a manner renders the hairline of the base column 50 as it is shown in region 56. This region visibly no longer shows a hairline and is also discontinuous. However, due to the limited resolution of the eye it can be achieved—given corresponding resolution of the print image—that this visibly interrupted region appears to be a straight line. This is also abetted in an actual printing process in that the printed pixels are not squares but rather are normally points of greater or lesser width or overlapping points.

The method shown in FIG. 5, in which the pixels used to reduce the image size are established stochastically, line by line, can be applied not only as shown for source bitmaps whose pixels are respectively encoded with multiple bits but also in particular for source bitmaps that for their part have only one bit per pixel. For example, such bitmaps can be bitmaps that are already dithered in advance. A subsequent dithering process 34 as shown in FIG. 5 is then no longer necessary.

Instead of the paper web 11 as described above, paper of different manufacture—for example paper manufactured in sheets—or even other materials, for example transparent plastic film materials that deform under the influence of heat can also be used as a recording medium. If the deformation of the material produces an expansion of the recording medium instead of a shrinkage, a corresponding "reversed" image processing process can be applied in order to correct the registration errors produced by the expansion. The term "shrinkage" within the scope of this Specification would then be respectively replaced with the term "expansion" or general "deformation". In the respective processes a raster graphic or an image would be expanded/enlarged instead of compressed/reduced, or vice versa.

In addition to the per-row or per-column deformation, it is also conceivable to provide a deformation correction in the angled direction. More than two source pixels can be used as an algorithm or mapping rule for the calculation of target pixels. In addition to the simple arithmetic calculation, more complex functions—in particular functions that weight multiple pixels differently—can be used as a mapping function, for example interpolations, spline functions or other one-dimensional or two-dimensional window functions.

Figure 6:
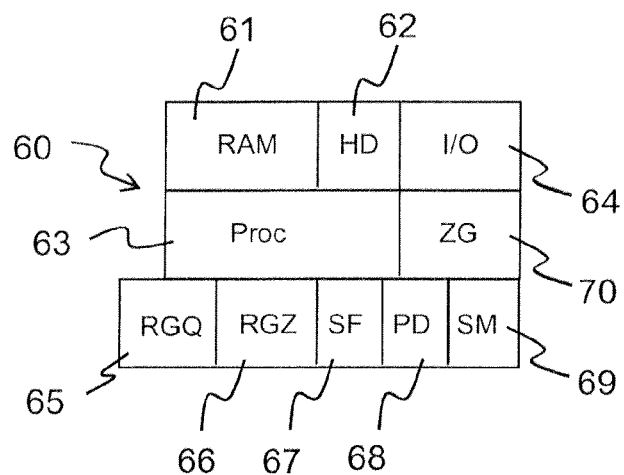
FIG. 6 illustrates components of a computer system.

Basic components of a computer system that can be used to execute the preferred embodiments are shown in FIG. 6. They essentially represent a computer 60 that has a working memory (RAM) 61 in which data can be cached for execution and a non-volatile memory (hard disk, for example) 62 on which a computer program producing the described processes is stored. All process steps and variables are programmed in the computer program. Corresponding parameter values—for example for the calculation functions—can be stored in the computer program or also separately on the hard disk, for example, in particular as look-up tables (LUT). The computer 60 furthermore contains a microprocessor 63 and an interface 64 via which data (for example) can be exchanged with the controller 14, with camera sensors and/or with the control panel 24 of the printer 15. Data of source bitmaps and target bitmaps can be cached in raster graphic memories before, during and/or after they are processed with the microprocessor 63 using the computer program. A memory 67 contains a value for a shrinkage factor that, for example, is input via the control panel 24 or is calculated. The limit value for the maximum distance K is stored in the memory 68. Control and calculation results (for example) can be shown on an optional monitor 69. A random number generator 70 can be used to establish the per-line stochastic distribution of the source calculation points.

Figure 7:
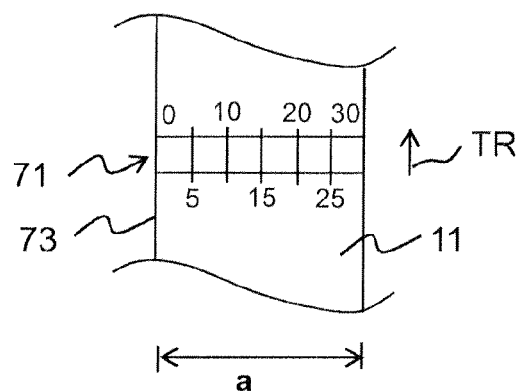
FIGS. 7a, b illustrate a shrinkage compensation with stochastic selection of pixels.
Figure 7:
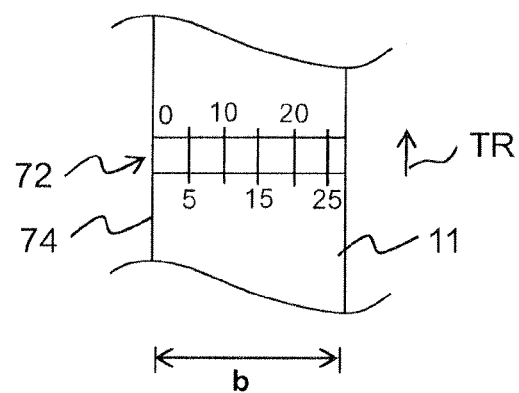

In FIG. 7a it is shown how a shrinkage factor can be determined simply in a given printing system 12. The paper web 11 is thereby transported through the printing system 12 with a fixed reference edge 73 along the transport direction TR, and a ruler 71 is printed transverse to the transport direction. For example, given the full paper width a ruler with full width (i.e. a scale value of "30") can then be printed by a first print group. If the same ruler is printed in a second printing process after the paper web 11 has been heated (and has thereby shrunk to a width b), the image shown in FIG. 7b results in which the printed ruler 72 with a scale value of "27" breaks away at the right paper edge 74.

Via the equation $$\frac{M_2}{M_2 - M_1} = \frac{30 - 27}{30} = 1\%$$

the shrinkage factor of 1% can be determined easily and the methods described above for compensation of the paper shrinkage can be applied. The width of the paper web can be manually read by an operator using the printed ruler or can also be detected automatically with an optical sensor or camera, for example. In the automated case the paper width of the unshrunk and shrunk paper can also be detected without printing a ruler, and therefore the degree of shrinkage can be determined wholly automatically during the print operation (on the fly) and the shrinkage correction can be implemented accordingly.

In summary, it can be explained that:

A method for correction of registration errors is applied for digital printing processes in which a recording medium is printed at least twice by means of raster graphics and is subjected to a treatment between the printing processes, via which printing processes it deforms along one of the deformation axes (for example shrinks due to a heat treatment) and registration errors thereby arise. The data of the raster graphic of at least one of the two print images are thereby processed along an image processing axis of the raster graphic that corresponds to the deformation axis. The respective source pixels that are to be used are selected stochastically from the source image, transverse to the image processing axis.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A method to correct a registration error in a printing process, comprising the steps of:
    subjecting data of first and second images to be printed to a respective raster image process via which at least first and second respective raster graphics structured in rows and columns are generated;
    forming control data for a print member or two respective print members from the first raster graphic and the second raster graphic;
    printing a recording medium in a first printing process with the control data of the first image;
    subjecting the recording medium to a treatment via which said recording medium and the first image deform by a deformation factor at least along one deformation axis;
    printing the recording medium in a second printing process with the control data of said second image; and
    to avoid a registration error between the first and the second printed images, processing the control data of the respective raster graphic of at least one of the first and second print images as a source image along an image processing axis of the respective raster graphic that corresponds to the deformation axis and wherein respective source pixels to be used for the respective raster graphic are selected stochastically from the source image in a direction transverse to the image processing axis.

2. The method according to claim 1, wherein the following process steps occur:
    selecting a base column in the source image;
    establishing a limit value K that determines a maximum pixel distance from the base column at which a deformation compensation can be applied;
    determining a whole-number value that lies between −K and +K line by line with a random number generator, and using said whole-number value to determine with which column shift relative to the base column two source pixels are used to calculate a target pixel; and
    calculating the target pixel from the two source pixels according to a predetermined function.

3. The method according to claim 2 wherein an arithmetic means function, an interpolation function, a spline function and/or a one-dimensional or two-dimensional window function is used to process the source pixels.

4. The method according to claim 3 wherein the window function comprises an image processing window with predetermined weighting for p×q pixels adjacent to the respective source pixel, and wherein p and q are whole numbers greater than zero.

5. The method according to claim 1 wherein a target pixel is calculated from n respective adjacent source pixels in the source image according to a predetermined calculation rule, wherein n is a whole number and greater than 1, and a proportion of processed source pixels along the image processing axis corresponds to the deformation factor.

6. The method according to claim 1 wherein each source pixel in the source image comprises multiple data bits as a source bytemap and a corresponding target bytemap for target pixels is calculated from the source bytemap.

7. The method according to claim 5 wherein the calculation rule is applied to the target pixels after the rastering process, and then a dithering process is applied to the target pixels generated with the calculation rule, via which dithering process binary bitmap image data are generated for the printing process.

8. The method according to claim 1 wherein said treatment is a heat treatment, the deformation is a shrinkage and the deformation factor is a shrinkage factor.

9. The method according to claim 1 wherein, to determine the deformation factor along the deformation axis of the recording medium, in the first and second printing processes a print image of a same ruler is respectively printed across a respective full width of the recording medium such that the recording medium rests on a same reference edge in both printing processes and a same starting point of the ruler is respectively printed at said reference edge, and the deformation factor is calculated from two just-printed scale values of the ruler that are present at an opposite paper edge.

10. A printing system device to correct a registration error in a printing process, comprising:
    a raster image processor which generates first and second raster graphics structured in rows and columns with data of a first respective image and data of a second respective image;
    a print member or two respective print members receiving control data from the respective first and second raster graphics;
    the print member printing on a recording medium a first print image in a first printing process with the control data from the first raster graphic;
    a treatment unit for subjecting the recording medium and the printed first image thereon to a deformation which deforms the medium and the printed first image by a deformation factor at least around one deformation axis;
    the at least one printing member or the other of the two printing members printing the recording medium with a second print image in a second printing process with the control data from the second raster graphic; and
    a processing system to avoid a registration error between the first and the second printed images and which processes the control data of the respective raster graphic of at least one of the first and second print images as a source image along an image processing axis of the respective raster graphic that corresponds to the deformation axis and wherein respective source pixels to be used for the respective raster graphic being selected stochastically from the source image in a direction transverse to the image processing axis.

11. A method to correct a registration error in a printing process, comprising the steps of:
- subjecting data of first and second images to be printed to a raster image process via which at least respective first and second raster graphics structured in rows and columns are generated;
- respectively forming control data for a print member or two respective print members from the respective first and second raster graphics;
- printing a recording medium with a first print image in a first printing process with the control data of the first raster graphic;
- subjecting the recording medium to a treatment via which said recording medium and the printed first print image are deformed by a deformation factor at least along one deformation axis;
- printing the recording medium with a second print image in a second printing process with the control data of the second raster graphic; and
- to avoid a registration error between the first and second printed images, processing the data of the raster graphic of at least one of the first or second print images as a source image along an image processing axis of the respective raster graphic that corresponds to the deformation axis, wherein a target pixel is calculated from respective adjacent source pixels of the source image according to a predetermined calculation rule wherein n is a whole number greater than one, and a proportion of process pixels along the image processing axis corresponds to the deformation factor.

12. The method according to claim 11 wherein each source pixel of the respective raster graphic comprises multiple data bits called a source bytemap, and a corresponding target bytemap for the target pixels is calculated from the source bytemap.

13. The method according to claim 11 wherein the calculation rule is applied to the target pixels of the respective raster graphic after the rastering process, and then a dithering process is applied to the target pixels generated with the calculation rule, and via said dithering process binary bitmap data are generated for the printing process.

* * * * *